United States Patent
Basile et al.

(10) Patent No.: US 7,469,617 B2
(45) Date of Patent: Dec. 30, 2008

(54) TENSION COMPENSATING ASSEMBLY FOR MECHANICAL CONTROL CABLES

(75) Inventors: Patrick Basile, Raymond, OH (US); Charles Haase, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 557 days.

(21) Appl. No.: 10/897,039

(22) Filed: Jul. 22, 2004

(65) Prior Publication Data
US 2006/0053939 A1   Mar. 16, 2006

(51) Int. Cl.
*B60T 7/10* (2006.01)
(52) U.S. Cl. .................................. 74/501.5 R
(58) Field of Classification Search ............... 74/500.5, 74/501.5 R, 502.4, 502.6
See application file for complete search history.

(56) References Cited

U.S. PATENT DOCUMENTS

| | | | |
|---|---|---|---|
| 3,789,967 A | 2/1974 | Dau et al. | |
| 4,304,322 A | 12/1981 | Beccaris | |
| 4,324,503 A * | 4/1982 | Sevrence | 403/197 |
| 4,428,180 A | 1/1984 | Carlson | |
| 4,448,090 A | 5/1984 | Carre et al. | |
| 4,464,950 A | 8/1984 | Deligny | |
| 4,833,937 A | 5/1989 | Nagano | |
| 5,261,293 A | 11/1993 | Kelley | |
| 5,277,080 A | 1/1994 | Roelle | |
| 5,377,556 A | 1/1995 | Byrnes | |
| 5,857,386 A | 1/1999 | Ruhlman | |
| 6,279,415 B1 | 8/2001 | Chance et al. | |

FOREIGN PATENT DOCUMENTS

| | | |
|---|---|---|
| EP | WO 8703659 | 6/1987 |
| EP | 0342143 | 11/1989 |
| EP | 0394355 | 7/1995 |
| EP | 0692627 | 1/1996 |
| EP | 0984180 | 3/2000 |
| EP | 1406023 A2 | 4/2004 |
| JP | 2159408 | 6/1990 |
| JP | 19880314397 | 6/1990 |
| WO | WO 8906323 | 7/1989 |

* cited by examiner

*Primary Examiner*—Richard W L Ridley
*Assistant Examiner*—Matthew Johnson
(74) *Attorney, Agent, or Firm*—Mark E. Duell; Michael A. Forhan; Eley Law Firm Co.

(57) ABSTRACT

A tension compensation assembly for a mechanical control cable. The tension compensation device has a housing with opposing ends. First and second sections of the control cable pass through but are attached at each end of the housing such that the sheaths of each section are coupled to the housing and reciprocable cable coaxially disposed in each control cable section extend into the housing. The cables are attached to opposing ends of a reciprocably disposed capsule or spring caps generally enclosing a spring. In operation, the capsule moves slidably within the housing over a predetermined travel and tension for the cables. However, if an over-tension condition is experienced, the capsule may bottom out at an end of the housing and the spring will either compress or extend, depending upon its design, thus allowing the effective length of the control cable assembly to increase, thus preventing the stretching or breaking of the cables or damage to cable end fittings.

11 Claims, 6 Drawing Sheets

TENSION COMPENSATING ASSEMBLY FOR MECHANICAL CONTROL CABLES

FIELD

The present invention relates generally to a tension compensation device, particularly to an apparatus for preventing stretching and/or breakage of control cables and their end fittings during use.

BACKGROUND

A control cable typically comprises a flexible outer sheath encasing a multi-strand cable capable of free coaxial movement within the sheath. The control cable is installed such that the sheath is captively engaged at both ends and the inner cable is reciprocally movable within the fixed sheath. Control cables are commonly used to actuate remotely located latched devices in a vehicle and elsewhere. Examples of latched device applications include hood releases, fuel door releases, trunk releases, as well as passenger seat releases. In a typical configuration, a first end of a cable is connected to a release lever or other control mechanism accessible to an occupant of a vehicle. A second end of the inner cable is typically connected to a release mechanism of the latched device which, when engaged, maintains the device in a closed or latched position. To manually release the latched device, an operator actuates the suitable release lever, causing the cable to tense within the control cable assembly. Once the tension on the control cable exceeds the force of the latching device, it unlatches.

A particular problem with the use of control cables to release latched devices is the potential for over-travel, or over-tensioning, of the cable components. Over-travel may occur when an operator actuates the release lever and/or the latched device beyond their intended travel limits. This can cause excessive tension on the cables, which can lead to their stretching or breaking as well as causing damage to any end fittings attached thereto.

There is a need for a modification for a mechanical control cable assembly that is capable of being actuated through a normal range of movement and tension without restriction, yet prevents the cable components from being stretched or broken due to over-travel by an associated control mechanism or latch.

SUMMARY

A tension compensated control cable assembly is disclosed according to the present invention. The tension compensation portion includes a housing with opposing ends. First and second sheathed control cable sections pass through at each end of the housing such that the sheath of each section is captively retained by the housing at each end. Reciprocable cables, coaxially disposed within each control cable section extends into the housing through their respective sheathes. A first cable within the first sheathed control cable passes longitudinally through a first end of a capsule that is reciprocably disposed within the housing. The first cable further passes longitudinally through a compression spring and is coupled to a spring cap. The spring is captively retained between the first end of the capsule and the spring cap and is compressible within the capsule. A second cable within the second control cable passes through a second end of the housing and a second end of the capsule, where it is captively retained.

In operation, one embodiment of the invention operates such that the compression spring remains in open-coil condition when in its unloaded state. The first and second control cable sections are each attached to one of a latched device and a control mechanism, such as a mechanical lever, which can be either manually or machine operated. Applying tension on one of the cable sections with the control mechanism results in longitudinal reciprocating movement of the capsule within the housing, causing axial movement of the opposing cable, thereby actuating and releasing the latched device. Thus, the first and second control cable sections cooperate to function as a conventional, unitary control cable when operated within the design limits of a particular latch and cable release application. However, in the event of an over-travel or over-tensioned condition, such that the tension on the cable exceeds a predetermined amount, the spring will compress as the spring cap is drawn toward the first end of the capsule, increasing the effective length of the control cable assembly and thus limiting the tension on its components until a mechanical stop of either the release lever or actuated device is reached. As a result, the risk of stretching or breaking of the control cable components and/or damage to their end fittings is greatly lessened.

The device comprises a first control cable section having an outer sheath and a reciprocable inner cable and a second control cable section having an outer sheath and a reciprocable inner cable, and a coil spring having first and second opposing ends, the first spring end being coupled to an end of the cable of the first control cable section and the second spring end being coupled to an end of the cable of the second control cable section. A free end of the first control cable section is coupled to a control mechanism and a free end of the second control cable section is coupled to a remote latched device such that the control cable assembly is effective to release the latched device upon actuation of the control mechanism. However, since the coils of the spring deform when the tension of the first and second cables exceeds a predetermined load, this reduces the risk of damage to the control cable assembly in the event of an over-travel condition.

The tension compensator comprises a housing having first and second opposing ends. A capsule having first and second opposing ends is reciprocably disposed within the housing, the capsule including a spring cap slidably disposed within the capsule and a compression spring captively retained between the spring cap and the first end of the capsule. A first control cable section comprises a first longitudinal, hollow sheath coupled to the first end of the housing, and a first cable reciprocally disposed within the first sheath, extending through the first end of the housing, the first end of the capsule and the spring, the end of the cable being coupled to the spring cap. A second control cable section comprises a second longitudinal, hollow sheath passing through but captively retained by the second end of the housing, and a second cable reciprocally disposed within the second sheath, extending through the second end of the housing and being coupled to the second end of the capsule. A free end of the first control cable section is coupled to a control mechanism for exerting tension on the control cable assembly and a free end of the second control cable section is coupled to a latched device such that the actuation of the control mechanism is effective to release the latched device. However, since the spring compresses when the tension of the first and second cable wires exceeds a predetermined amount, this reduces the risk of damage to the control cable assembly in the event of an over-travel condition.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

In the discussion that follows, like numerals will be used to describe features having similar structure and/or function.

Figure 1:
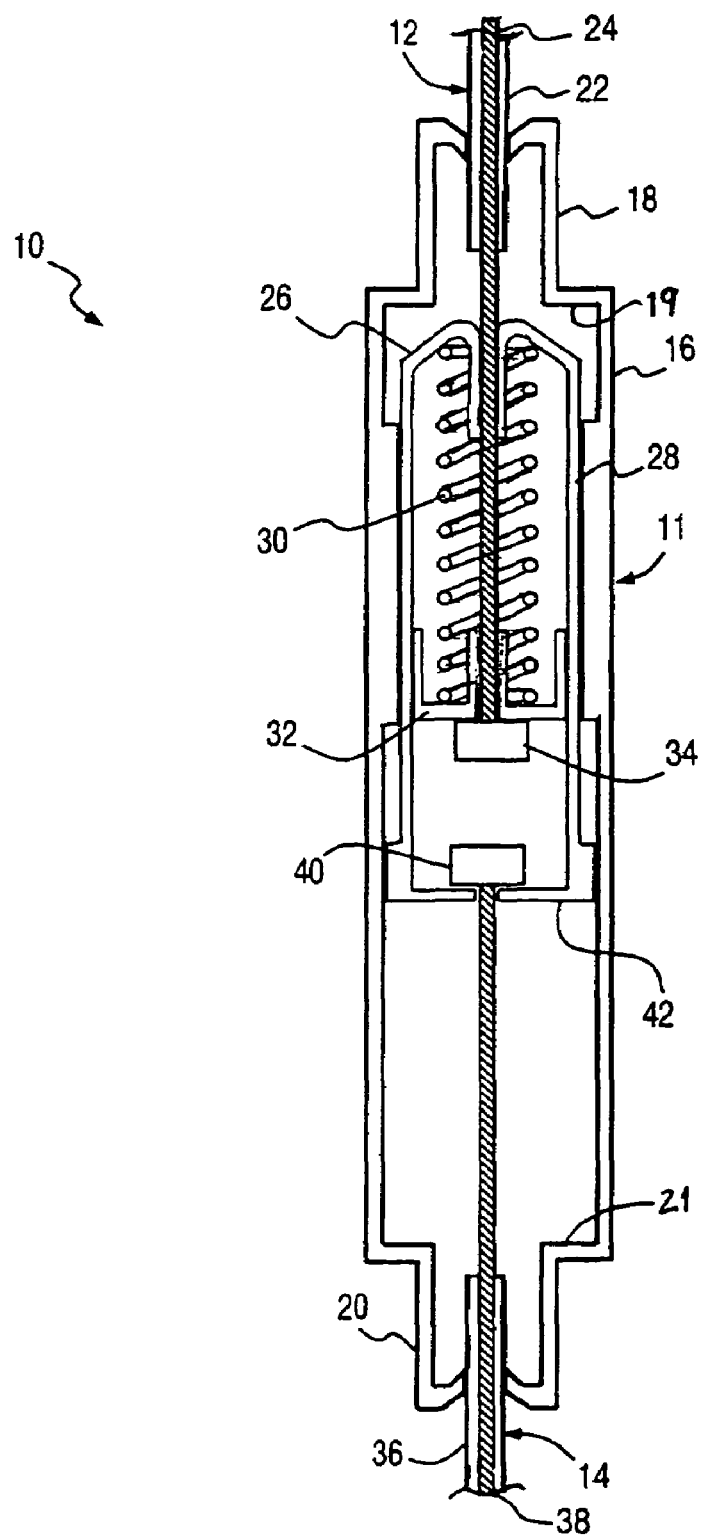
FIG. 1 is a view in section of a tension compensation assembly for a control cable according to an embodiment of the present invention.

A control cable assembly 10 having a tension compensation assembly 11 is shown in FIG. 1 according to an embodiment of the present invention. Tension compensation assembly 11 is interposed between a first control cable section 12 and a second control cable section 14. Tension compensation assembly 11 includes a housing 16, which may be one of a variety of shapes, such as generally cylindrical. First control cable section 12 engages housing 16 at a first end 18. Likewise, second control cable section 14 engages housing 16 at a second, opposing end 20.

Figure 5:
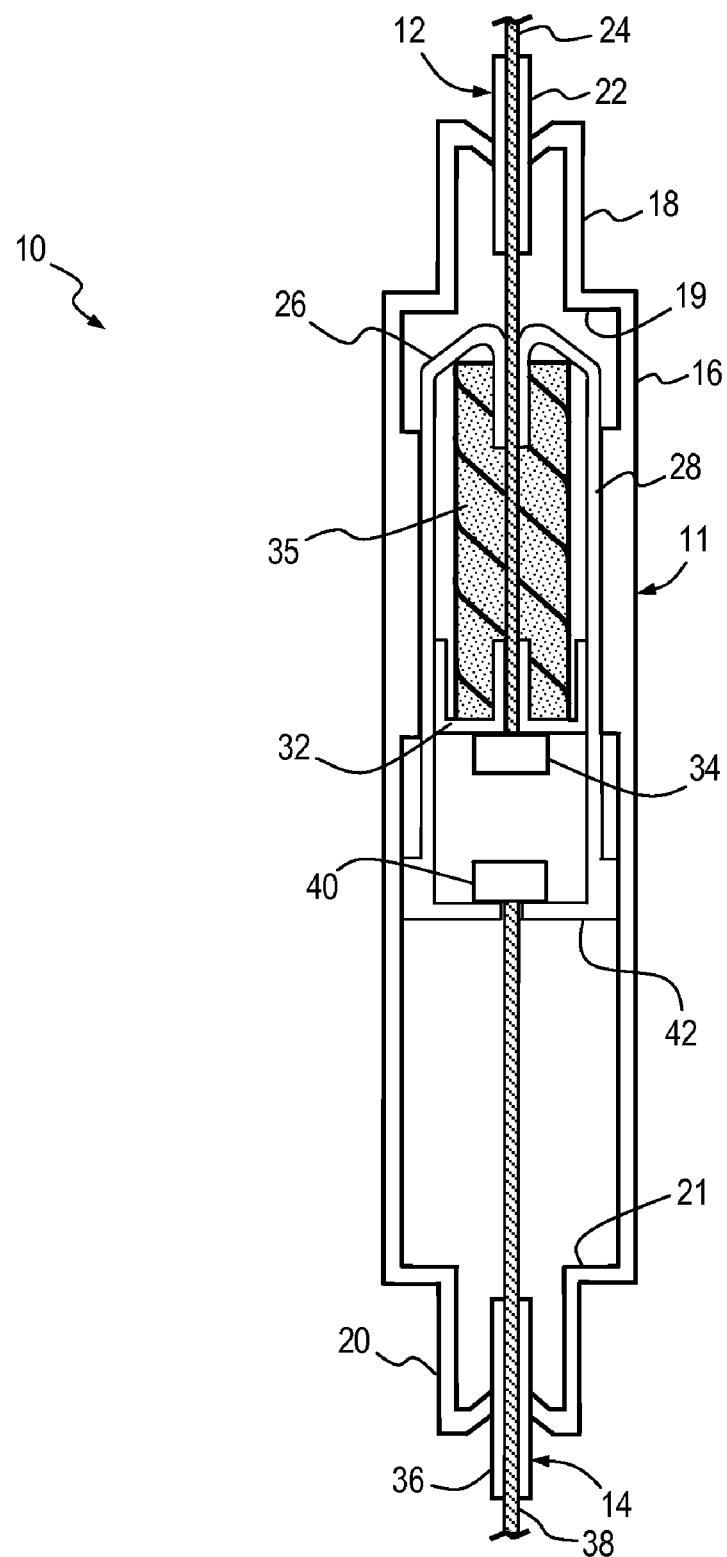
FIG. 5 is a view in section of a tension compensation assembly for a control cable according to another embodiment of the present invention.

First control cable section 12 includes a first sheath 22 and a first (inner) cable 24, the cable wire being disposed coaxially within the first sheath and longitudinally reciprocable. First sheath 22 is coupled to first end 18 of housing 16, while first cable 24 passes into housing 16 through first end 18 and into a first end 26 of a capsule 28. Sheathed cable sections pass through first and second ends of the housing and are captively retained using conventional means. Capsule 28 is reciprocable within housing 16. First cable 24 passes generally coaxially through the longitudinal axis of a compression-type open-coil spring 30 disposed within capsule 28, and then through a spring cap 32 that is likewise reciprocable within the capsule. A first end fitting 34 is coupled to an end of first cable 24, and is provided to exert force upon spring cap 32 during actuation of a control mechanism 46 (see FIG. 6). Although the embodiment of FIG. 1 is shown using an open-coil spring 30, other materials having similar elastic properties may be employed to accomplish the same or similar functions as the spring. Such materials may include a compressible material 35 such as rubber, foam rubber or other elastomers, as shown in FIG. 5.

Second control cable section 14 includes a second sheath 36 and a second (inner) cable 38, the second cable being disposed coaxially within the second sheath and longitudinally reciprocable. Second sheath 36 engages second end 20 of housing 16, while second cable 38 passes into housing 16 through second end 20 and is coupled to a second end 42 of capsule 28 by a second end fitting 40.

Figure 6:
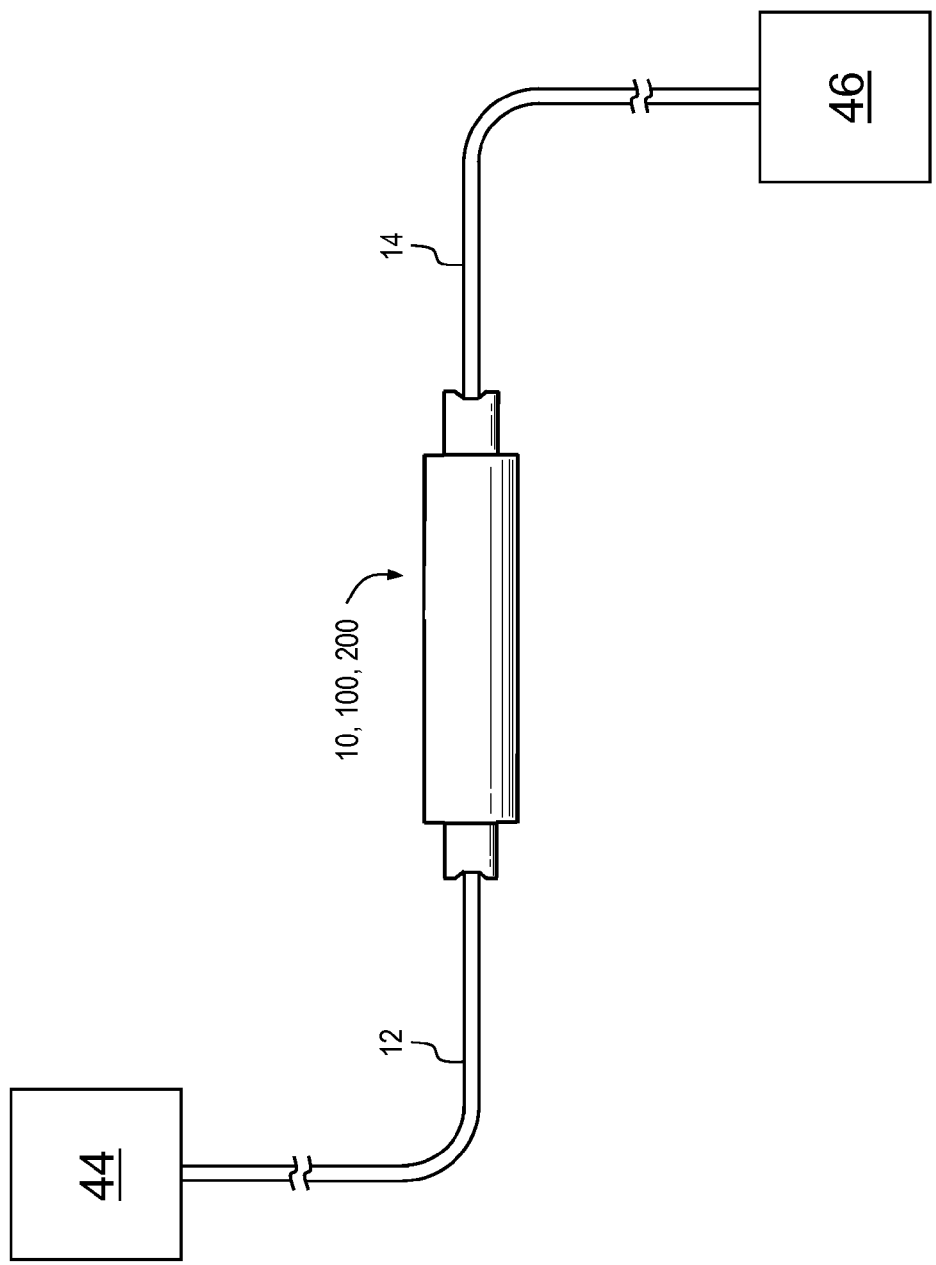
FIG. 6 shows the general arrangement of a tension compensation assembly operatively employed with a latched device and a control mechanism.

With continued reference to FIG. 1 together with FIG. 6, during operation of this embodiment of the invention, coil spring 30 is in open-coil condition when not under a load. The spring rate of spring 30 is preferably designed having a value such that the spring remains essentially in an uncompressed state for the range of tension normally expected in a control cable for a particular latched device application. First control cable section 12 and second control cable section 14 are attached to one of a actuable latched device 44 and a control mechanism 46, such as a lever, in any conventional manner. Exerting tension on one of either cables 24, 38 by actuation of the control mechanism results in a tensing both of the cables causing slidable longitudinal movement of capsule 28 within housing 16. This results in a corresponding movement of the opposing cable, thereby actuating and releasing the connected latched device. Thus, first and second control cable sections 12, 14 function as a unitary control cable when operated within the design limits of a particular latched device.

However, in the event of an over-travel condition wherein the tension exerted on cables 24, 38 exceeds a predetermined amount, capsule 28 bottoms out against end 18 of housing 16, such as at an interior face 19, which forms a first stop for the capsule. Alternatively, capsule 28 may bottom out against end 20 of capsule 28, such as at an interior face 21, which forms a second stop for the capsule and is longitudinally spaced apart from the first stop. In some embodiments either or both ends of capsule 28 may be shaped to correspond to the size and shape of the adjacent stop, such as capsule second end 42 and face 21. Spring 30 compresses as first end fitting 34 and spring cap 32 slidably move toward first end 26 of capsule 28, allowing the effective length of cable wires 24, 38 to increase until a mechanical stop (not shown) of the control mechanism or remotely actuated device is reached. This prevents excessive tension that could stretch or break the cable wires or damage connectors and end fittings (not shown) coupled to the cables.

Figure 4A:
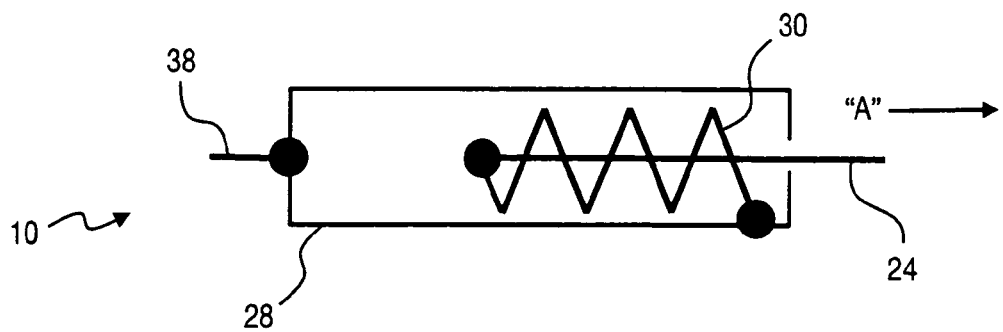
FIG. 4A is a functional schematic diagram of the tension compensation assembly of FIG. 1.

A functional schematic diagram of control cable assembly 10 is shown in FIG. 4A. As can be seen, spring 30 is encased by capsule 28. Spring 30 remains in an unloaded state and capsule 28 travels reciprocally within its corresponding housing 16 (see FIG. 1) over the normal range of travel and tension of cables 24, 38 for a particular control mechanism and latched device 46, 44, respectively (see FIG. 6). However, in the event of an over-travel condition, one end of capsule 28 bottoms out against interior face 19 at end 18 of housing 16 (or, alternatively, against interior face 21 at end 20 of the housing) causing spring 30 to compress as cable 24 is tensed in direction "A," as depicted in FIG. 4A. The compression length of spring 30 is sufficiently long enough such that a mechanical stop of the control 46 and/or latched device 44 is reached before the spring becomes fully loaded (compressed, in this embodiment).

Figure 2:
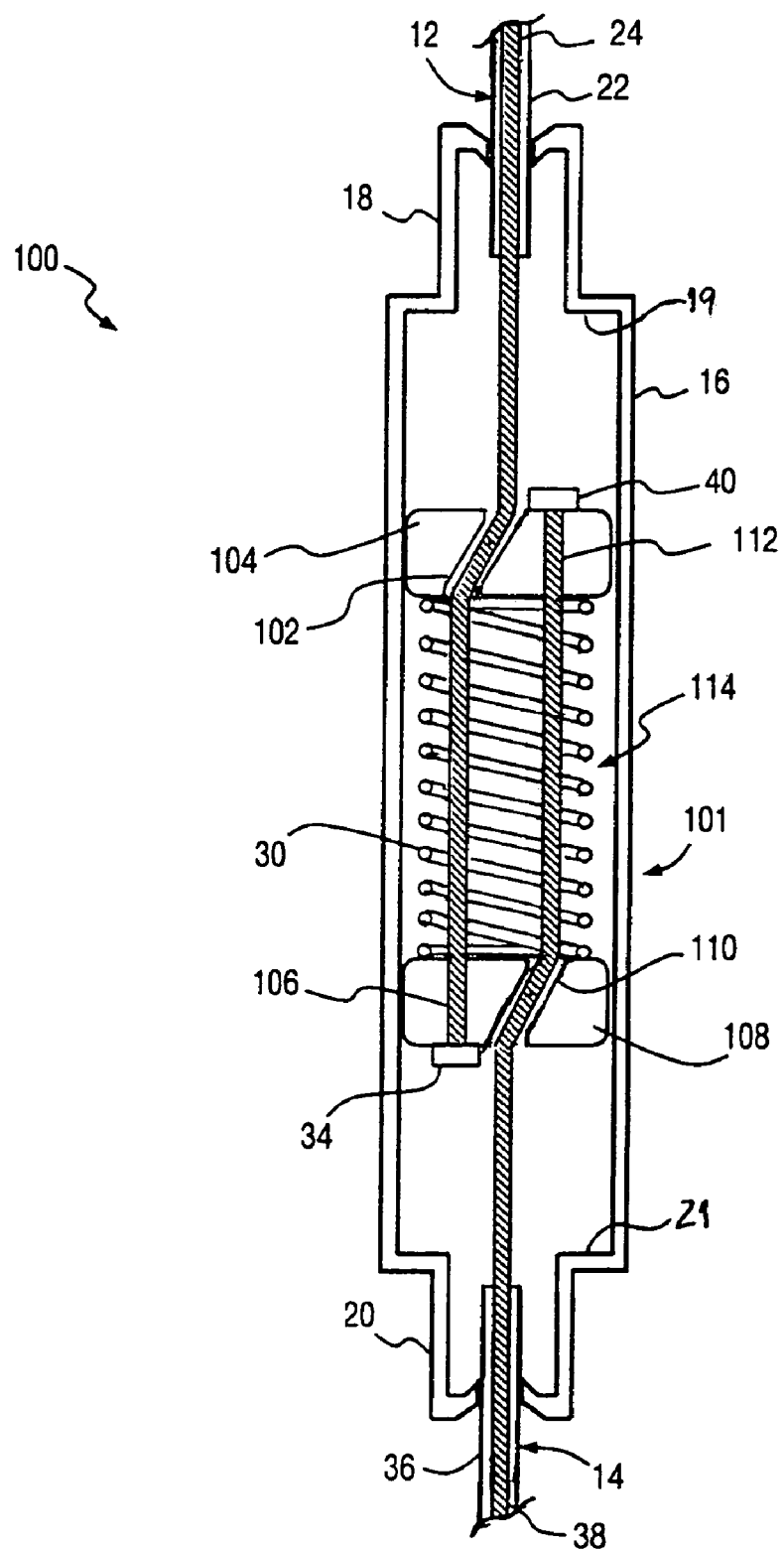
FIG. 2 is a view in section of a tension compensation assembly for a control cable according to an embodiment of the present invention.

Referring next to FIG. 2, a tension compensation assembly 101 for a control cable is shown according to an alternate embodiment of the present invention. Tension compensation assembly 101 is located intermediate a first control cable section 12 and a second control cable section 14. First control cable section 12 engages housing 16 at a first end 18. Conversely, second control cable section 14 engages housing 16 at a second, opposing end 20. Housing 16 may be one of a variety of shapes, such as generally cylindrical.

First control cable section 12 includes a first sheath 22 and a first (inner) cable 24, the cable wire being disposed coaxially within the first sheath and longitudinally reciprocable. First sheath 22 is coupled to first end 18 of housing 16, while first cable 24 passes into housing 16 through first end 18 via first sheath. First cable 24 then passes through a first opening or slot 102 of a first spring cap 104. First cable 24 passes through the open longitudinal axis of a compression-type coil spring 30, which may be helical as shown, and then through a first opening or slot 106 of a second spring cap 108. A first end fitting 34 is coupled to an end of first cable 24, and is provided to exert force upon spring cap 108 during actuation of a control mechanism (not shown).

Second control cable section 14 includes a second sheath 36 and a second cable 38, the second cable being disposed coaxially within the second sheath and longitudinally reciprocable. Second sheath 36 passes through and is captively retained by second end 20 of housing 16, while second cable 38 passes through a second opening or slot 110 of second spring cap 108. Second cable 38 then passes generally through the center of spring 30, generally parallel to first cable 24, and then through a second opening or slot 112 of first spring cap 104. A second end fitting 40 is coupled to the end of second cable 38, and is provided to exert force upon spring cap 104 during actuation of a control mechanism (not shown). Spring 30 is thus captively retained between first and second spring caps 104, 108 by cables 24, 38, the spring, cable wires, spring caps and end fittings forming a tension compensation assembly 114.

With continued reference to FIG. 2 together with FIG. 6, during operation of this embodiment compression spring 30 is in its open-coil condition prior to the application of any significant load. The spring rate of spring 30 is preferably designed having a value such that the spring remains essentially in its uncompressed (unloaded) state over the normal range of tension expected in a control cable for a particular latched device application. First control cable section 12 and second control cable section 14 are attached to one of a latched device 44 and a control mechanism 46, such as a lever, in any conventional manner. Exerting tension on one of cables 24, 38 with the control mechanism results in slidable longitudinal movement of tension compensation assembly 114 within housing 16, resulting in axial movement of the opposing cable, thereby actuating and thus releasing the latched device. Thus, first and second control cable sections 12, 14 cooperate to function as a unitary control cable when operated within the design limits of a particular remotely actuated latched device.

However, in the event of an over-travel condition, wherein the tension on inner cables 24, 38 exceeds a predetermined amount, spring 30 compresses as first and second spring caps 104, 108 move slidably toward each other, allowing the effective overall length of cables 24, 38 to increase until a mechanical stop (not shown) of the control mechanism 46 or latched device 44 is reached, thus preventing excessive tension that could stretch or break the cables or damage connectors and end fittings 34, 40 coupled to the ends of the cables.

Figure 4B:
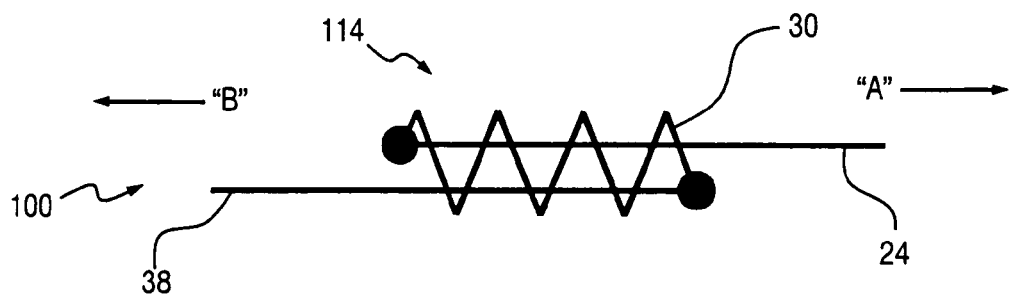
FIG. 4B is a functional schematic diagram of the tension compensation assembly of FIG. 2.

A functional schematic diagram of control cable assembly 100 is shown in FIG. 4B. As can be seen, cables 24, 38 pass generally parallel to one another through the center of compression-type coil spring 30 in opposing directions, each being attached to end caps 104, 108 at opposing ends of the spring. Spring 30 remains substantially uncompressed as tension compensation assembly 114 travels reciprocally within housing 16 (see FIG. 2) over the normal range of travel and tension of cables 24, 38 for a particular control mechanism 46 and latched device 44 application (see FIG. 6). However, in the event of an over-travel condition, spring 30 compresses as cable 24 is tensed in direction "A" and cable 38 is tensed in opposing direction "B". The compression length of spring 30 is preferably such that a mechanical stop of the control mechanism and/or remotely latched device is reached before the spring reaches it fully loaded condition (fully compressed).

Figure 3:
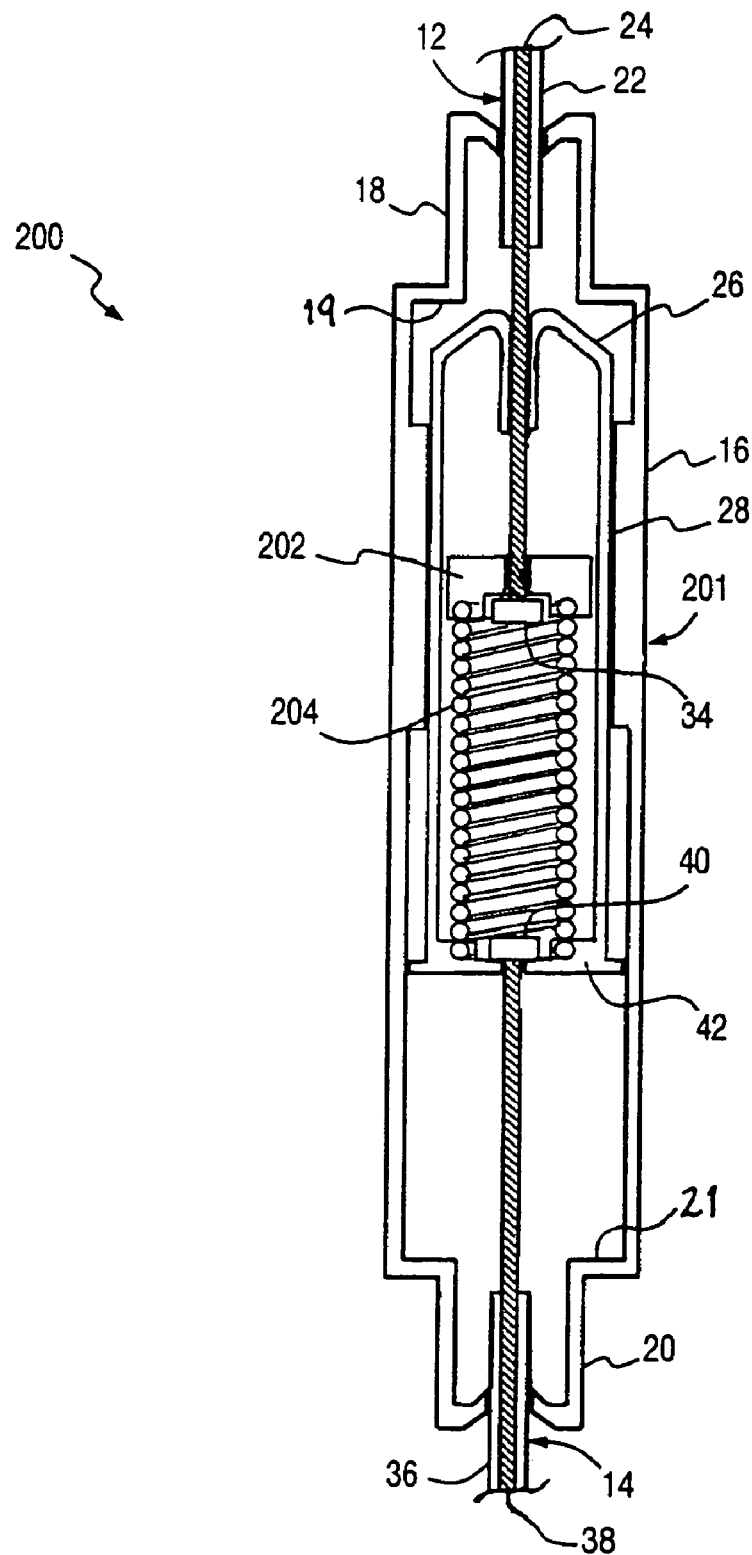
FIG. 3 is a view in section of a tension compensation assembly for a control cable according to an embodiment of the present invention.

Referring now to FIG. 3, a control cable 200 having a tension compensation assembly 201 is shown according to yet another embodiment of the present invention. Tension compensation assembly 201 is interposed between a first control cable section 12 and a generally opposing second control cable section 14. Tension compensation assembly 201 includes a housing 16, which may be one of a variety of shapes, such as generally cylindrical. First control cable section 12 is coupled to housing 16 at a first end 18. Likewise, second control cable section 14 is coupled to housing 16 at a second, opposing end 20.

First control cable section 12 includes a first sheath 22 and a first cable 24, the cable being disposed coaxially within the first sheath and longitudinally reciprocable. First sheath 22 passes through and is captively engaged by first end 18 of housing 16, while first cable 24 passes into housing 16 through first end 18 and into a first end 26 of a capsule 28. Capsule 28 is slidably reciprocable within housing 16. Cable 24 passes through an endpiece 202. A first end fitting 34 is coupled to an end of first cable 24, and is provided to exert parting force upon spring cap 108 during actuation of the control mechanism (not shown).

Second control cable section 14 includes a second sheath 36 and a second cable 38, the second cable being disposed coaxially within the second sheath and longitudinally reciprocable. Second cable 38 passes into housing 16 through second end 20 and is coupled to a second end 42 of capsule 28 by a second end fitting 40 affixed to an end of the second cable. Both ends of a closed-coil extension spring 204 are preferably captively retained by end piece 202 and second end 42 of capsule 28. As will be appreciated, alternate elastic means may be substituted for the extension spring without departing from the spirit of the present invention. Such alternative source of energy storage may include rubber bands, polymer strips or other spring configurations.

With reference to FIG. 3 in combination with FIG. 6, during operation of this embodiment of the invention, extension spring 204 is in its unloaded, closed-coil condition with the adjacent coils of the spring in close proximity to or in contact with one another. The spring rate of spring 204 may be configured in nearly any predetermined value such that the spring remains substantially in its unloaded profile for the range of tension expected in a control cable assembly for a given latching application. First control cable section 12 and second control cable section 14 are attached to one of a latched device 44 and a control mechanism 46, such as a lever, in any conventional manner. Applying tension on one of the cables 24, 38 with the control mechanism results in slidable longitudinal movement of capsule 28 within housing 16, resulting in a corresponding movement of the opposing cable section, thereby actuating and thus releasing the latched device. Thus, first and second control cable sections 12, 14 cooperate to function as a unitary control cable when operated within the design limits of a particular latched device application.

However, in the event of an over-travel condition, wherein the tension on cable wires 24, 38 exceeds a predetermined load condition, end 26 of capsule 28 bottoms out against interior face 19 of end 18 of housing 16 (or, alternatively, against interior face 21 at end 20 of the housing). At about that point, spring 204 extends as end piece 202 slidably moves toward first end 26 of capsule 28, allowing the effective combined length of cables 24, 38 to increase until a mechanical stop of the control mechanism 46 or latched device 44 is reached, thus preventing excessive tension that could stretch or break the cables or damage connectors and end fittings (not shown) coupled thereto.

Figure 4C:
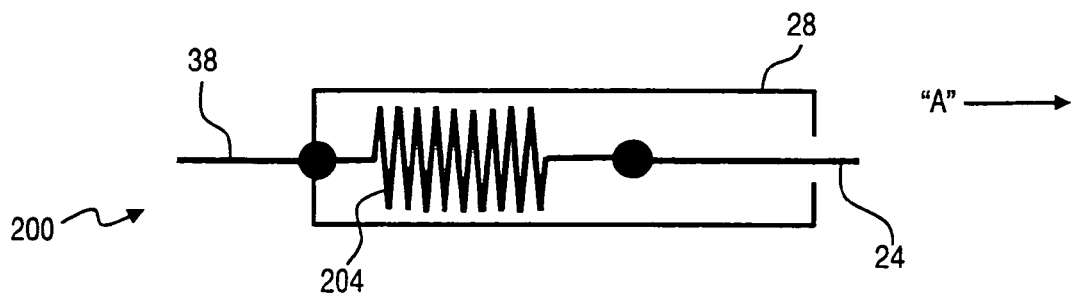
FIG. 4C is a functional schematic diagram of the tension compensation assembly of FIG. 3.

A functional schematic diagram of control cable assembly 200 is shown in FIG. 4C. As can be seen, extension spring 204 is enclosed by capsule 28. During normal operation, spring 204 remains in its substantially unloaded profile while capsule 28 travels reciprocally within housing 16 (see FIG. 3) over the normal range of travel and tension of cables 24, 38 for a particular control mechanism 46 and latched device 44 (see FIG. 6). However, in the event of an over-travel condition, end 26 of capsule 28 may bottom out against interior face 19 of end 18 of housing 16 (or, alternatively, against interior face 21 at end 20 of the housing) at about which point spring 204 extends as cable 24 is tensed in direction "A," as indicated in FIG. 4C. The extension length of spring 204 is preferably such that a mechanical stop of the control mechanism and/or the latched device is encountered prior to the spring reaching its elastic limit.

While this invention has been shown and described with respect to detailed embodiments thereof, it will be understood by those skilled in the art that changes in form and detail thereof may be made without departing from the scope of the claims of the invention.

We claim:

1. A tension compensation assembly for a mechanical control cable, comprising:
    an elongated housing having a first and second opposing, recessed housing end, the first recessed housing end extending away from an interior face that forms a first stop, the second recessed housing end extending away from an interior face that forms a second stop;
    a capsule slidably disposed within the housing, the capsule having first and second opposing capsule ends, the first capsule end being configured to come into contact with the first stop and the second capsule end being configured to come into contact with the second stop;
    a spring disposed within the capsule, the spring having first and second opposing spring ends;
    a first control cable section having a first outer sheath and a first reciprocable inner cable, an end of the first outer sheath being retained within the first recessed housing end, an end of the first inner cable extending through the first spring end and being coupled to the second spring end; and
    a second control cable section having a second outer sheath and a second reciprocable inner cable, an end of the second outer sheath being retained within the second recessed housing end, an end of the second inner cable being coupled to the first spring end,
    wherein a free end of the first control cable section is configured to be coupled to a control mechanism for exerting tension on the first and second inner cables when actuated and a free end of the second control cable section is configured to be coupled to a latched device such that actuation of the control mechanism is effective to release the latched device, and
    wherein the capsule freely reciprocates with the first and second inner cables when the tension is below a predetermined threshold, and wherein one of the capsule ends comes into contact with its stop such that the spring deforms as the tension of the inner cables exceeds the threshold.

2. The tension compensation assembly of claim 1 wherein the spring is a coil spring.

3. The tension compensation assembly of claim 1 wherein the spring is an elastomer.

4. A tension compensation assembly for a mechanical control cable, comprising:
    an elongated, cylindrical housing having a first and second opposing, recessed housing end, the first recessed housing end extending away from an interior face that forms a first stop, the second recessed housing end extending away from an interior face that forms a second stop;
    a capsule slidably disposed within the housing, the capsule having first and second opposing capsule ends, the first capsule end being configured to come into contact with the first stop and the second capsule end being configured to come into contact with the second stop;
    a spring disposed within the capsule, the spring having first and second opposing spring ends;
    a first control cable section comprising a first longitudinal, hollow sheath, an end of the sheath being retained within the first recessed housing end and a first inner cable reciprocally disposed within the first sheath, the first inner cable extending through the first housing end and the first spring end, and being coupled to the second spring end;
    a second control cable section comprising a second longitudinal, hollow sheath, an end of the sheath being retained within the second recessed housing end and a second inner cable reciprocally disposed within the second sheath, extending through the second housing end and being coupled to the first spring end;
    wherein a free end of the first control cable section is configured to be coupled to a control mechanism for exerting tension on the first and second inner cables when actuated and a free end of the second control cable section is configured to be coupled to a latched device such that actuation of the control mechanism is effective to release the latched device, and
    wherein the capsule freely reciprocates with the first and second cables when the tension is below a predetermined threshold, and wherein one of the capsule ends comes into contact with its stop such that the spring deforms as the tension of the inner cables exceeds the threshold.

5. The tension compensation assembly of claim 4 wherein the spring is a coil spring.

6. The tension compensation assembly of claim 4 wherein the spring is an elastomer.

7. A tension compensation assembly for a mechanical control cable, comprising:
    an elongated housing having a first and second opposing, recessed housing end, the first recessed housing end extending away from an interior face that forms a first stop, the second recessed housing end extending away from an interior face that forms a second stop;
    a capsule slidably disposed within the housing and having first and second opposing capsule ends, the first capsule end being configured to come into contact with the first stop and the second capsule end being configured to come into contact with the second stop the capsule including a spring cap slidably disposed within the capsule and a compressible spring retained between the spring cap and the first end of the capsule;

a first control cable section having a first longitudinal, hollow sheath an end of the sheath being retained within the first recessed housing end and a first inner cable reciprocally disposed within the first sheath, said first inner cable extending through the first housing end, through the first capsule end, through the spring, and being coupled to the spring cap;

a second control cable section comprising a second longitudinal, hollow sheaths, an end of the sheath being retained within the second recessed housing end and a second inner cable reciprocally disposed within the second sheath, said second inner cable extending through the second housing end and being coupled to the second capsule end, wherein a free end of the first control cable section is configured to be coupled to a control mechanism for exerting tension on the first and second inner cables when actuated and a free end of the second control cable section is configured to be coupled to a latched device such that actuation of the control mechanism is effective to release the latched device; and wherein the capsule freely reciprocates with the first and second inner cables when the capsule moves between the ends of the housing, but deforms to effectively increase the overall length of the inner cables when one of the ends of the capsule is in contact with its stop and the tension exceeds a predetermined amount.

8. The tension compensation assembly of claim 7 wherein the spring is a coil spring.

9. The tension compensation assembly of claim 7 wherein the spring is an elastomer.

10. The tension compensation assembly of claim 7 wherein the first inner cable is coupled to the spring cap within the capsule with a first end fitting and the second inner cable is coupled to the second end of the capsule with a second end fitting.

11. A tension compensation assembly for a mechanical control cable, comprising:

a generally hollow, elongated housing having a first and second opposing, recessed housing end, the first recessed housing end extending away from an interior face that forms a first stop, the second recessed housing end extending away from an interior face that forms a second stop;

a generally hollow capsule having first and second opposing capsule ends and being slidably moveable between the stops, the first capsule end being configured to come into contact with the first stop and the second capsule end being configured to come into contact with the second stop;

a spring disposed within the capsule and having first and second opposing spring ends;

a first control cable section having a first outer sheath and a first reciprocable inner cable, an end of the first outer sheath being retained within the first recessed housing end, one end of the first inner cable extending through the first end of the spring and being coupled to the second end of the spring and an opposing end of the first inner cable being configured to be coupled to a control mechanism; and a second control cable section having a second outer sheath and a second reciprocable inner cable, an end of the second outer sheath being retained within the second recessed housing end, one end of the second inner cable being coupled to the first end of the spring, an opposing end of the second inner cable being configured to be coupled to a latched device such that actuation of the control mechanism is effective to release the latched device, wherein the capsule freely reciprocates with the first and second inner cables when the tension is below a predetermined threshold, and wherein one of the capsule ends comes into contact with its stop such that the spring deforms as the tension of the inner cables exceeds the threshold.

* * * * *

UNITED STATES PATENT AND TRADEMARK OFFICE
CERTIFICATE OF CORRECTION

PATENT NO. : 7,469,617 B2
APPLICATION NO. : 10/897039
DATED : December 30, 2008
INVENTOR(S) : Patrick Basile and Charles Haase Page 1 of 1

It is certified that error appears in the above-identified patent and that said Letters Patent is hereby corrected as shown below:

In claim 7, line 12, "stop the capsule" should read --stop, the capsule--.

In claim 7, line 24, "hollow sheaths" should read --hollow sheath--.

Signed and Sealed this

Twenty-fourth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,469,617 B2  Page 1 of 1
APPLICATION NO. : 10/897039
DATED : December 30, 2008
INVENTOR(S) : Patrick Basile and Charles Haase It is certified that error appears in the above-identified patent and that said Letters Patent is hereby corrected as shown below:

Column 8, In claim 7, line 64, "stop the capsule" should read --stop, the capsule--.

Column 9, In claim 7, line 9, "hollow sheaths" should read --hollow sheath--.

This certificate supersedes the Certificate of Correction issued February 24, 2009.

Signed and Sealed this

Fourteenth Day of April, 2009

JOHN DOLL
*Acting Director of the United States Patent and Trademark Office*